May 26, 1925.

C. F. CARTER

COMBINED NOZZLE AND PRESSURE GAUGE

Filed Jan. 31, 1923

1,539,073

Inventor:
Charles Francis Carter
By A. A. Yanochowski
Attorney.

Patented May 26, 1925.

1,539,073

UNITED STATES PATENT OFFICE.

CHARLES FRANCIS CARTER, OF DES MOINES, IOWA.

COMBINED NOZZLE AND PRESSURE GAUGE.

Application filed January 31, 1923. Serial No. 616,028.

*To all whom it may concern:*

Be it known that I, CHARLES FRANCIS CARTER, a citizen of the United States of America, and a resident of Des Moines, county of Polk, and State of Iowa, have invented certain new and useful Improvements in Combined Nozzles and Pressure Gauges, of which the following is a full and clear specification.

My invention relates to combination valve stem engaging nozzles and tire pressure gauges and has to do more particularly with such devices as are used for filling and determining the pressure of pneumatic devices, such as automobile tires and the like.

It has been customary to provide separate devices for filling and noting the pressure of pneumatic tires. This arrangement has been somewhat unsatisfactory and it is one of the objects of my invention to obviate the necessity of applying a pressure gauge to a tire stem to measure the pressure in the tire, then the removal of the same and the application of the nozzle connected to the pressure tank or pump to increase the pressure in the tire, and a reoperation of this cycle of operation until the desired pressure is had in the tire.

With my invention, when the combined nozzle and pressure gauge is applied to the valve stem of the tire, the pressure is immediately shown by the tire pressure gauge. If it is found that the pressure in the tire is not sufficient, the operator then actuates a valve to permit air to enter the tire. The operator then releases the valve and the pressure in the tire is again registered on the tire-pressure gauge. This operation is repeated until the desired pressure is reached. The use of my combination tire filling nozzle and gauge, obviates the necessity of providing more than one tire gauge per each tire engaging nozzle.

A further object of my invention resides in the arrangement of the parts of my device so that the same may readily be applied to the valve stem of tires mounted on all types of wheels; especially truck wheels and disc and wire wheels which are so constructed that it is practically impossible to apply a vertically extending tire-pressure gauge.

Another object of my invention is the provision of a guard for the valve operating member of my device to protect the same against injury.

It is still a further object of my invention to provide an improved device of the class described which will obviate the undesirable features of prior devices and embody desirable features and advantages all in a simple, efficient, and economical manner and, for the accomplishment of this object and such others as may hereinafter appear, the invention consists in the novel details of constructions, parts, and combination of parts hereinafter described and particularly pointed out in the appended claim, reference being had to the accompanying drawing forming a part hereof in which the same reference characters indicate like parts throughout the several views and in which:

Figure 1:
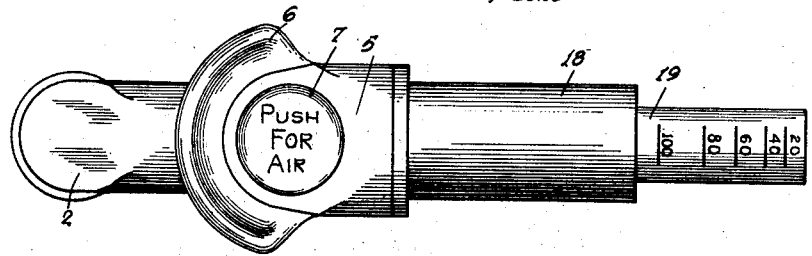
Figure 1 is a top-plan view of my device.
Figure 2:
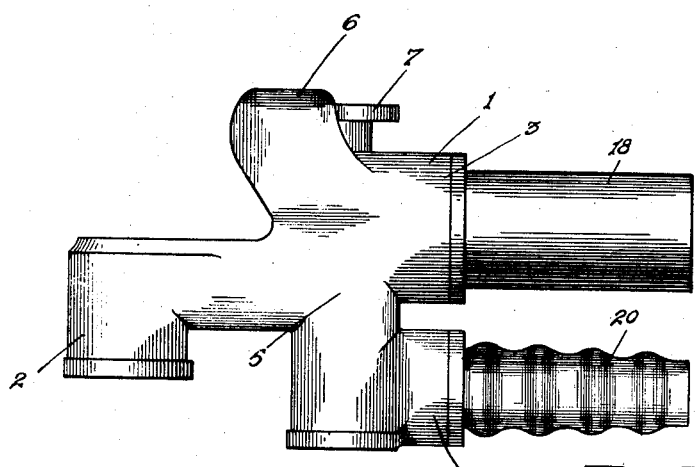
Figure 2 is a side-plan view of my device.
Figure 3:
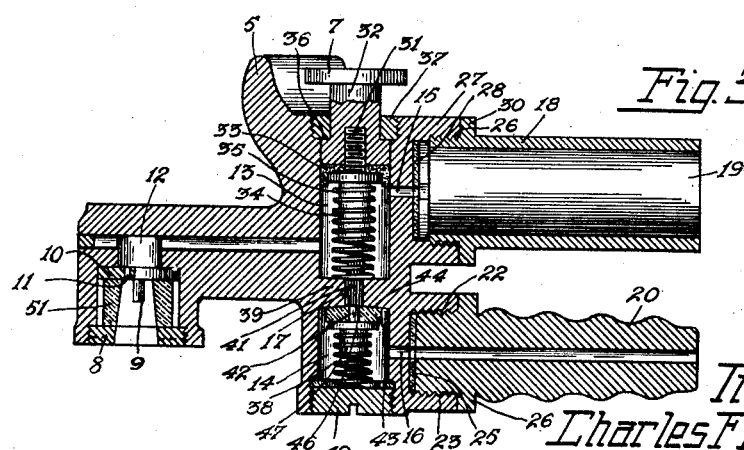
Figure 3 is a sectional view showing details of construction of the same.

Referring to the annexed drawing, 1 represents a housing member consisting of a main body portion and three separate connecting members; 2 the nozzle or valve stem engaging member; 3 the member to which is attached the guard member which holds the tire pressure gauge; and 4 the member to which is attached the member connected to the air supply line. These three members are preferably formed integrally with the main body portion 5 which encloses the valve mechanism. The housing member 1, is provided with a guard member 6 for protecting the valve operating member 7. By having the pressure gauge and the air-line connection extending rearwardly, I am able to materially decrease the height of my device and to extend the nozzle 2 forwardly so that it may easily be applied to the tire valve stem of a pneumatic tire no matter upon what type of wheel the tire may be mounted.

The guard 6 readily protects the valve operating member 7 against injury, should the device be dropped or mistreated. The tire-stem engaging member or nozzle is provided with the usual gasket or gripper 51 for making an air-tight connection with the valve stem, and a pin 9 is provided for opening the valve in the valve stem. The washer 10, which holds the pin 9, is provided with a plurality of small holes 11 about the pin 9 (only one of the holes is shown in the drawing). These holes, of course, readily provide a passage way for the air from the tire stem to the port 12 which extends to the main body portion 5 of the device. A plug 8 is provided for holding the gripper 51 and the washer 10 in place. The said plug is provided with threads and has screw-threaded engagement with threads cut in the side wall of the nozzle.

The main body portion 5 of the device contains an upper chamber 13 and a lower chamber 14. The upper chamber contains a valve which controls the port 15 leading to the tire-pressure gauge, while the lower chamber is provided with a valve for controlling the supply of air from the supply tank through the line connecton and the port 16 into the lower chamber 14 and from this chamber through the port 17 into the upper chamber 13. The tire gauge protecting member 18, holds the pressure gauge 19, which may be of any approved type, in position. 20 is the usual member to which is connected the hose which connects to the supply tank or pump. One end of the member 20, is screw threaded and adapted for engagement with the threads 22 cut in the member 23. A rubber gasket 25 is provided to make an air-tight connection. I also provide a flange 26 adapted to abut against member 23 to make a screw-tight connection. The gauge-guard member 18 has its one end threaded for screw-threaded engagement with the threads 26' cut in member 27. A gasket 28 is provided to make an air-tight connection between the gauge 19 and chamber 13. The guard is also provided with a flange 30 for abutment against member 27. In the upper chamber 13, the valve mechanism therein consists of a screw-threaded member 31 which has screw-threaded engagement with a piston or plunger 32. To the top of piston 32 is connected an operating button 7. Between the member 31 and the piston 32, I provided a leather washer or plunger 33. This plunger is held in place by the flange of member 31. Extending downwardly on member 31, is a cylindrical portion 34, the function of which will be hereinafter explained. A spring 35 is provided to hold the piston 32 in its normal position. Piston 32 is provided with a shoulder 36 which abuts against an annular nut or plug 37 which is provided with screw threads and adapted to engage the threads in the housing to hold the piston 32 in position.

The wall 39, which separates the upper chamber from the lower chamber, is provided with an annular orifice or port 17. Through this orifice extends the stem of the lower valve, which stem has a triangular cross section. The stem 41 is provided with an annular groove 42 which receives the gasket 43. The gasket 43 abuts against the bottom face 44 of the partition 39 to prevent entrance of air from the lower chamber into the upper chamber. A coiled spring 38 is provided, which encircles the cylindrical portion 47 of the valve and abuts against the flange portion 46 of the valve, to hold the valve in its normal position. A screw-threaded plug 49 is provided which has screw-threaded engagement with the housing member 1 to maintain the spring in position.

From this description it will be noted that I enclosed all of the mechanism of my device in the housing and do not have any of the valve mechanism outside of the housing subject to injury. It is further to be noted that my valve mechanism may be very readily removed both from the upper and the lower chambers by merely removing the plugs which hold the valves in place.

In the construction just described, it will be observed that if it is desired to take the pressure of the tire, the nozzle of my device is applied to the valve stem of the tire, whereupon the pin 9 operates the valve in the valve stem and permits the air from the tire to pass through the orifices 11 into the port 12 and through this port into the upper chamber 13 out of this chamber through the port 15 to the pressure gauge. The pressure gauge thus responds and indicates the air pressure in the tire. When it is desired to inflate the tire, the operator simply presses the button 7 which moves the piston 32 causing the same to close the port 15, and thus shutting off the passage from the chamber 13 to the pressure gauge. The further operation of the piston 32 causes member 34 to engage valve member 41 operating it against the pressure of the coiled spring 38 and the air pressure opening the passage from the lower chamber 14 into the upper chamber 13 thereby permitting air from the supply tank to enter through port 16 into chamber 14, through port 17 into the upper chamber 13, through port 12 and the orifices 11 in washer 10 into the tire. When the operator relieves pressure upon the button 7, the valve in the lower chamber closes to shut off the air supply, then the valve in the upper chamber opens the port 15 to permit air to reach the gauge to indicate the pressure in the tire as hereinbefore described.

It is thus seen that the valves are operated in the proper sequence so as to prevent sudden shocks that would otherwise occur if the pressure of the air line was permitted to pass directly into the pressure gauge. It is further seen that my device is so constructed as to render all the parts readily accessible for the purpose of repairs.

While I have shown the housing as a unitary structure, it may readily be formed of one main body portion, and the nozzle, gauge protecting member, and hose-connecting member be formed separately having screw-threaded engagement with the main body portion of the housing.

In illustrating my invention, I have shown a specific embodiment, but I do not wish to be limited to the exact structure as shown, as many modifications and changes may readily suggest themselves to those skilled in the art and, therefore, I aim to cover all such changes and modifications as come within the spirit and scope of the appended claim.

Having described my invention what I desire to secure by United States Letters Patent is:

An inflating device comprising a valve housing including an air hose nipple, a pressure gauge carried by the housing, valves in the housing for controlling the passage of air to a tire valve or the gauge, an operating button for the valves arranged externally of the housing, and a crescent shaped guard formed integrally with the housing and partly surrounding and extending above said operating button to protect the same.

Signed by me at Des Moines, in the county of Polk and State of Iowa, this 26th day of January, 1923.

CHARLES FRANCIS CARTER.